United States Patent [19]

Ooka

[11] Patent Number: 4,650,055

[45] Date of Patent: * Mar. 17, 1987

[54] CLUTCH RELEASE APPARATUS FOR CHANGE SPEED TRANSMISSION

[75] Inventor: Yuzo Ooka, Tokyo, Japan

[73] Assignee: Honda Giken Kogyo Kabushiki Kaisha, Tokyo, Japan

[ * ] Notice: The portion of the term of this patent subsequent to May 21, 2002 has been disclaimed.

[21] Appl. No.: 709,496

[22] Filed: Mar. 8, 1985

Related U.S. Application Data

[63] Continuation of Ser. No. 387,280, Jun. 10, 1982, Pat. No. 4,518,070.

[30] Foreign Application Priority Data

Jun. 23, 1981 [JP] Japan .................................. 56-96023

[51] Int. Cl.4 ............................................ F16D 25/08
[52] U.S. Cl. .............................. 192/85 CA; 192/91 A; 192/96
[58] Field of Search ..................... 192/91 A, 96, 85 CA

[56] References Cited

U.S. PATENT DOCUMENTS

| | | | |
|---|---|---|---|
| 2,412,331 | 12/1946 | Green | 192/96 X |
| 2,969,052 | 1/1961 | Randol | 192/91 A |
| 3,283,866 | 11/1966 | Giacosa | 192/96 |
| 3,848,852 | 11/1974 | Therkildsen | 192/91 A X |
| 3,915,433 | 10/1975 | Therkildsen | 192/91 A X |
| 4,030,575 | 6/1977 | Moring et al. | 192/91 A X |
| 4,287,977 | 9/1981 | Haga et al. | 192/91 A |
| 4,518,070 | 5/1985 | Ooka | 192/85 CA |

FOREIGN PATENT DOCUMENTS

| | | | |
|---|---|---|---|
| 2924234 | 4/1980 | Fed. Rep. of Germany | 192/96 |
| 773595 | 5/1957 | United Kingdom . | |

OTHER PUBLICATIONS

Shop Manual entitled "Honda 450 Super Sports Model CB-450" of Honda Motor Co., Ltd., 1966.
Article from German Publication, Motorradm Jun. 1981, pp. 20-22.

Primary Examiner—Rodney H. Bonck
Attorney, Agent, or Firm—Lyon & Lyon

[57] ABSTRACT

A push rod extends through the main shaft of a change speed gear transmission to release a friction clutch on that shaft. The other end of the push rod is engaged by a hydraulic actuator. An oil seal assembly for the push rod is prevented from being damaged by leakage of hydraulic oil, and this is accomplished by means of an air gap and vent between the hydraulic actuator and the oil seal assembly.

3 Claims, 4 Drawing Figures

CLUTCH RELEASE APPARATUS FOR CHANGE SPEED TRANSMISSION

This is a continuation of application Ser. No. 387,280, filed June 10, 1982, now U.S. Pat. No. 4,518,070.

This invention relates to a change speed gear transmission for delivering power from an internal combustion engine to an output shaft. The invention finds particular usefulness in connecting a motorcycle engine to the final drive shaft for the rear wheel.

It is highly desirable to employ a friction clutch for driving the change speed gear transmission from the engine crank shaft, and it is also desirable to employ the same lubricating oil for the engine, change speed transmission, and friction clutch. However, in order to operate the friction clutch it is desirable to employ an hydraulic actuator having a piston and cylinder. A push rod extends axially through the interior of a main shaft of the change speed gear transmission and this push rod engages an element of the friction clutch at one end and is caused to move axially by means of the hydraulic actuator at the other end.

A seal ring assembly is mounted on the housing for the change speed gear transmission and, in accordance with this invention, means are provided to prevent leaking of hydraulic oil from the hydraulic actuator from damaging the seal ring assembly. The hydraulic oil often has properties which are quite different from the lubricating oil within the change speed gear transmission, and therefore leakage of hydraulic oil may damage the oil seal assembly for the push rod. This is prevented by interposing an air barrier between said hydraulic actuator and the oil seal assembly. The air barrier has a vent open to atmosphere.

Other and more detailed objects and advantages will appear hereinafter.

Figure 1:
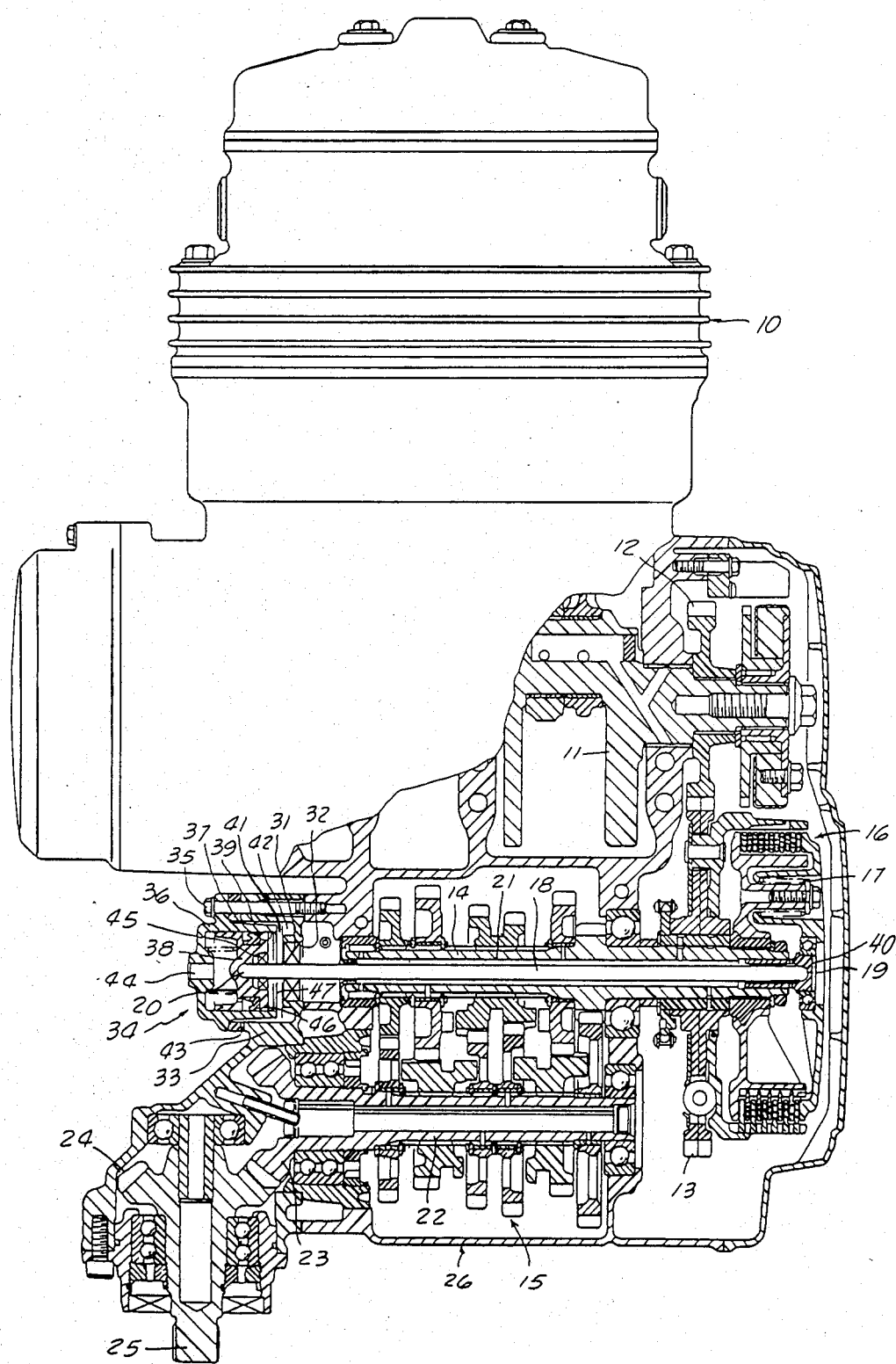
FIG. 1 is a front elevation of a V-type motorcycle engine partly broken away to show the change speed transmission and clutch operating mechanism constituting a preferred embodiment of this invention.
Figure 2:
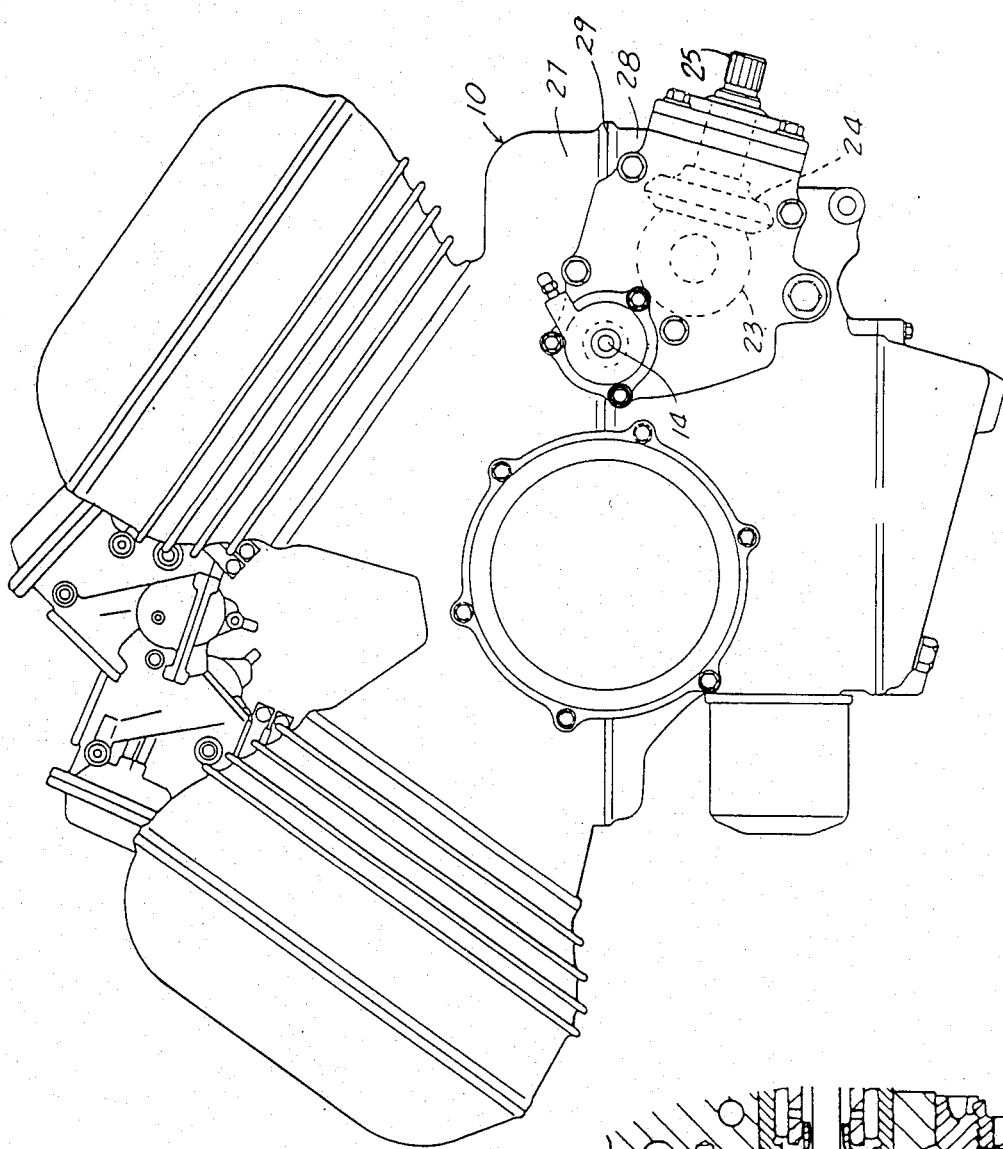
FIG. 2 is a side elevation.
Figure 1A:
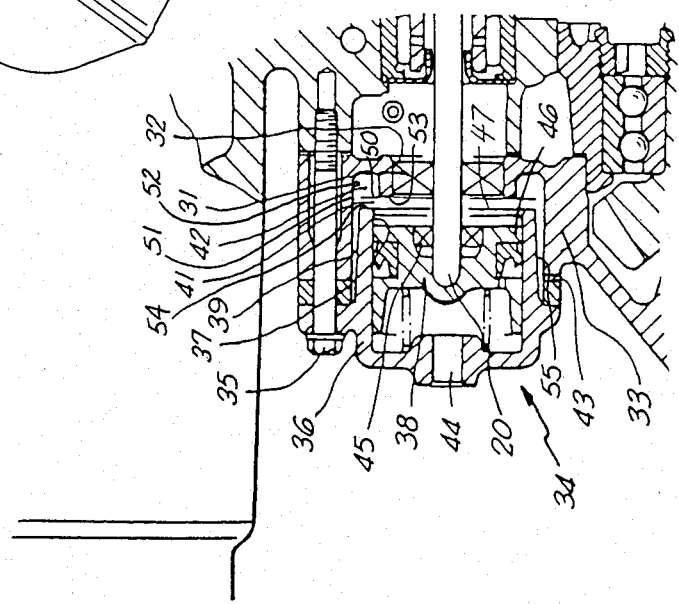
FIG. 1a is an enlarged view of the clutch release apparatus of FIG. 1.

Referring to the drawings, the motorcycle engine generally designated 10 is provided with a crank shaft 11 which extends transversely to the direction of travel of the motorcycle. A driving gear 12 fixed to the crank shaft meshes with a driven gear 13 mounted to turn on the main shaft 14 of the change speed gear transmission 15. A plate type friction clutch 16 is provided for connecting the driven gear 13 in driving relationship with the main shaft 14. A plurality of compression springs 17 serve to close the clutch 16, and a push rod 18 is provided to open the clutch 16.

The push rod 18 is rounded at both ends 19 and 20 and extends through the central axial opening 21 in the main shaft 14. The change speed gear transmission 15 provides a plurality of speed ratios between the main shaft 14 and the line shaft 22. A bevel gear 23 formed integrally with the line shaft 22 meshes with the bevel gear 24 formed integrally on the output shaft 25.

The change speed gear transmission 15 including the friction clutch 16 is contained within a stationary housing 26 formed of two halves 27 and 28 which meet on a junction line 29 to clamp the shafts 11 and 14 between them. The push rod 18 slides through an oil seal assembly 31 contained in a bore 32. A hydraulic clutch actuator device is provided at the end of the push rod 18 and includes a ring member 33. This ring member or actuator housing 33 forms an end wall barrier for the change speed gear transmission 15 and also provides support for a hydraulic actuator assembly 34 and the output shaft 25. Bolts 35 secure the ring member 33 in position on the housing 26.

The hydraulic actuator assembly 34 includes a stationary cylinder element 36 having a bore 37 slidably receiving a piston 38. Clearance space 39 is porvided around the outer portion of the cylinder element 36 and within the ring member 33, and this clearance space 39 as well as the interior spaces 41 and 42 all communicate with the vent opening 43. The clearance space 39 and the interior spaces 41 and 42, all within the hydraulic actuator device, together define a central cavity 50. Moreover, the cylinder element 36 and the ring member 33 form an inner wall structure 51 for the central cavity 50. The inner wall structure 51 includes a peripheral inner wall 52, a first end wall 53 and a second end wall 54. Also, the cylinder element 36 defines a peripheral outer wall 55. Hydraulic oil under pressure enters the hydraulic actuator assembly 34 through the central opening 44. Hydraulic pressure from the opening 44 acts on the piston 38 to move the push rod 18 toward the right, as viewed in FIG. 1, to cause the push rod 18 to act on the thrust element 40 to open the clutch 16 against the action of the springs 17. This disconnects the main shaft 14 from the crank shaft 11. A seal 45 retains grease for the rod end 20.

It will be understood that the oil seal assembly 31 has sliding contact with the push rod 18 so that hydraulic oil acting against the piston 38 is prevented from causing swelling of the oil assembly 31, and is prevented from mixing with the lubricating oil contained within the housing 26 for the change speed gear transmission 15. Leakage past the piston 38 and its seal ring 46 is vented through the spaces 39, 41 and 42, and the vent opening 43, constituting an air gap 47 between the piston 38 and the oil seal assembly 31.

Figure 3:
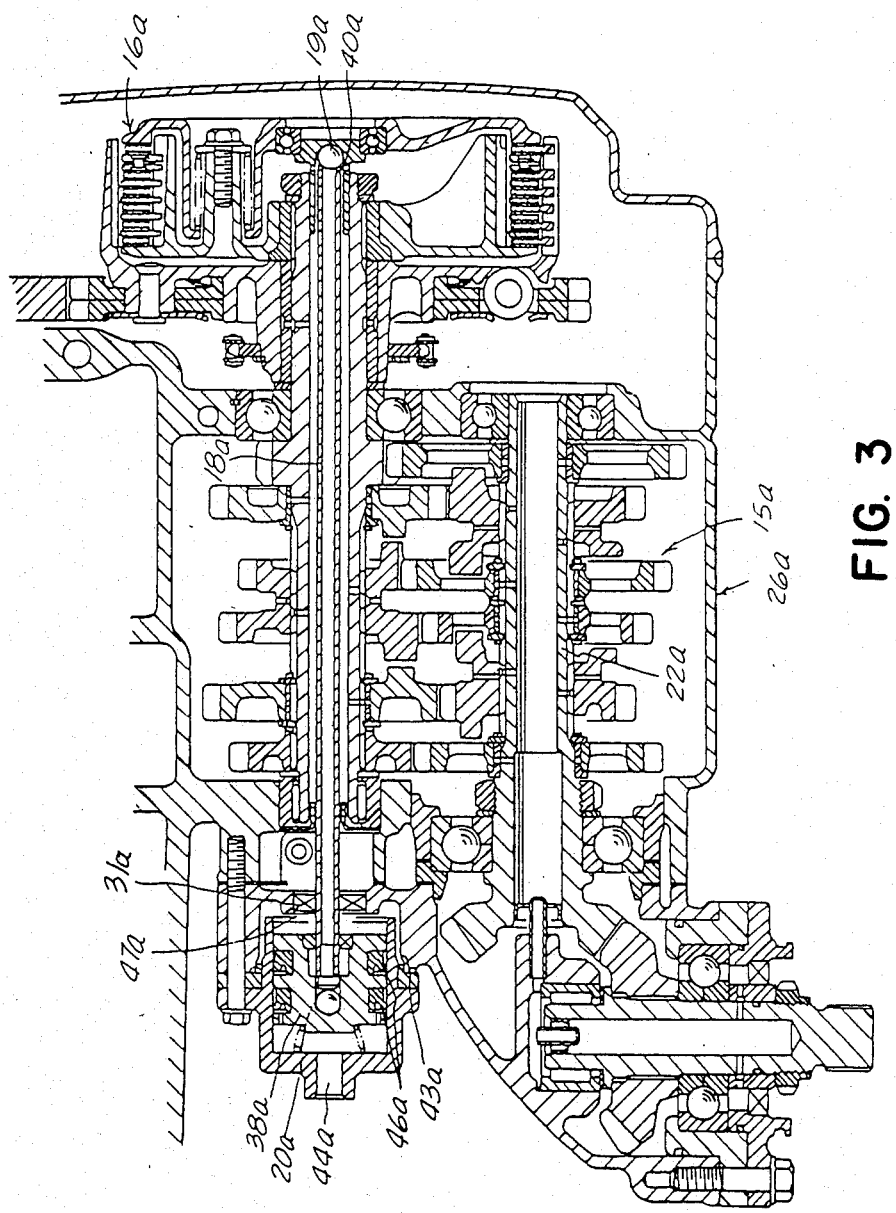
FIG. 3 is a section view similar to the sectioned portion of FIG. 1, and showing a modification.

In the modified form of the invention shown in FIG. 3, parts similar to those previously described are identified by the same number with the added suffix "a". The rounded ends 19 and 20 of the push rod 18 are replaced by spherical balls 19a and 20a mounted in the thrust element 40a and the piston 38a. The piston is provided with two seal rings 46a instead of a single seal ring. The air gap 47a and the vent opening 43a are preserved. Accordingly, hydraulic oil for the actuator 34a does not cause swelling and damage of the oil seal assembly 31a.

Having fully described my invention, it is to be understood that I am not to be limited to the details herein set forth but that my invention is of the full scope of the appended claims.

I claim:

1. In a change speed transmission for an internal combustion engine having a crank shaft, said transmission comprising:
    a main shaft; a line shaft; gear means for driving said line shaft at a plurality of speed ratios from said main shaft; means for driving said main shaft from the crank shaft including a clutch at one end of said main shaft; a push rod extending axially through the interior of said main shaft and operable to release said clutch; a hydraulic clutch actuator device at the other end of said main shaft for moving said push rod to release said clutch, said hydraulic clutch actuator device having a ring member, a central cavity in said ring member, a cylindrical bore extending to said central cavity and a piston in said cylindrical bore engaging said push rod, said central cavity having a peripheral inner wall larger than said cylindrical bore, a first end wall through which said push rod extends, a second end wall about the opening of said cylindrical bore, and a vent opening at said peripheral inner wall; a seal positioned about said push rod at said first end wall; and an output means for delivering power from said line shaft.

2. The change speed transmission of claim 1 wherein said cylindrical bore is defined within a cylinder element detachably mounted to said ring member at a mounting surface spaced from said first end wall.

3. A clutch release apparatus for a change speed transmission comprising:
   an actuator housing having a central cavity therein formed with a peripheral inner wall,
   a first end wall having a seal assembly bore therethrough and positioned between said central cavity and the interior of the change speed transmission,
   a seal assembly mounted in said seal assembly bore,
   a push rod slidably extending through said seal,
   a cylinder element within said actuator housing having a cylindrical bore extending into said central cavity to a second end wall, said second end wall extending outwardly from said cylindrical bore toward said peripheral wall and spaced from said first end wall by said central cavity, said cylindrical bore of said cylinder element including a piston engaging said push rod, and
   a vent opening through said actuator housing into said central cavity.

* * * * *